United States Patent [19]

Meyers et al.

[11] Patent Number: 5,715,372

[45] Date of Patent: Feb. 3, 1998

[54] METHOD AND APPARATUS FOR CHARACTERIZING AN INPUT SIGNAL

[75] Inventors: Martin H. Meyers, Montclair; Ahmed A. Tarraf, Bayonne; Carl Francis Weaver, Hanover, all of N.J.

[73] Assignee: Lucent Technologies Inc., Murray Hill, N.J.

[21] Appl. No.: 370,917

[22] Filed: Jan. 10, 1995

[51] Int. Cl.$^6$ .................................................. G06F 15/00
[52] U.S. Cl. ........................ 395/21; 395/2.79; 395/2.09
[58] Field of Search ..................... 395/2.35, 2.36, 395/2.11, 21, 22, 24, 20

[56] References Cited

U.S. PATENT DOCUMENTS

| | | | |
|---|---|---|---|
| 4,628,529 | 12/1986 | Borth et al. | 381/94 |
| 4,827,517 | 5/1989 | Atal et al. | 395/2.27 |
| 5,179,624 | 1/1993 | Amano et al. | 395/2.41 |
| 5,220,640 | 6/1993 | Frank | 395/2.11 |
| 5,263,107 | 11/1993 | Ueda et al. | 382/157 |
| 5,274,714 | 12/1993 | Hutcheson et al. | 382/157 |

FOREIGN PATENT DOCUMENTS 0586714  3/1994  European Pat. Off. ......... G10L 9/10

OTHER PUBLICATIONS

Simpson, "Artificial Neural Systems," Pegamon Press, p. 118, Dec. 30, 1990.

Fisz, "Probability Theory and Mathematical Statistics," John Wiley & Sons, pp. 461–467, Dec. 30, 1980.

Wang et al., "Auditory Distortion Measure for Speech Coding," ICASSP '91: Acoustics, Speech & Signal Processing Conference, pp.493–496, Dec. 30, 1991.

Chen et al., "A Robust low–delay Celp Speech Coder at 16 kbits/s," Globecom '89: IEEE Global Telecommunications Conference, pp. 1237–1241, Dec. 30, 1989.

Churchland and Sejnowski, "The Computational Brain," The MIT Press, pp. 107–138, Dec. 30, 1989.

Primary Examiner—Robert W. Downs
Assistant Examiner—Ji-Yong D. Chung

[57] ABSTRACT

The present invention provides a method and apparatus for measuring at least one signal characteristic. Initially, a set of features is selected which characterize a signal. An intelligent system, such as a neural network, is trained in the relationship between feature sets and signal characteristics. The selected feature set is then extracted from a first input signal. The extracted feature set from the first signal is input to the trained intelligent system. The intelligent system creates an output signal based on the feature set extracted from the first input signal. This output signal is then used to characterize the input signal. In one embodiment, the invention assesses voice quality, typically as expressed in MOS scores, in a manner which accurately corresponds to the analysis of human evaluators. For voice signals processed by voice coders, the present invention provides a measurement technique which is independent of various voice coding algorithms and consistent for any given algorithm.

21 Claims, 4 Drawing Sheets

METHOD AND APPARATUS FOR CHARACTERIZING AN INPUT SIGNAL

FIELD OF THE INVENTION

The invention relates to methods and apparatus for characterizing input signals and, more particularly, to the assessment of signal characteristics, such as signal quality, associated with subjective human analysis.

BACKGROUND OF THE INVENTION

In many circumstances, signal characteristics must be measured to determine whether systems which produce, transmit, and receive the signals are properly performing. Frequently, assessment of signal characteristics, such as signal quality, is complex because many factors are considered in such an assessment. For signals which are received by human senses, e.g., audio signals such as speech and music, and video signals, signal assessment often involves subjective human analysis. The resulting analysis is used to monitor the systems associated with the signal.

One field which heavily relies on human analysis of signals is telecommunications, particularly the area of voice quality. Effective quality control of voice signals, e.g., through control of voice coding schemes, typically reflects subjective quality assessment. The term "voice coding" refers to electrical representations of voice signals including, but not limited to, output from an individual voice coder/decoder (i.e., a device which produces a digital representation of a voice signal, typically for a telecommunications system), output from a voice coder which has been carried by a communications system and decoded, and analog representations of voice signals. For this reason, performance of voice signal control schemes frequently entails subjective listening tests. To be reliable, these tests must be consistent for all voice signals from a particular signal source, such as a voice coder, and coder independent for comparative assessment of the subjective quality of the various coding algorithms. A commonly used subjective measure is the mean opinion score ("MOS").

Typical MOS tests involve a sufficiently large subject group of people (e.g., 44 people), take longer than one month to conduct, and are expensive (e.g., can cost in the range of tens of thousands of dollars for preparation, testing and analysis). A long-sought ideal has been to evaluate voice quality with an automated measurement technique. Since any measure must ultimately be validated by comparison with subjective human assessment, the automated measure must predict the score of a generally accepted signal quality rating scheme, such as MOS, with accuracy and consistency.

Finding an accurate measuring technique for signal quality assessment has been a pressing task. A few prior studies have attempted to find such a measure for voice signals, with limited success. Table 1, taken from "Objective Measure of Speech Quality," S. Quackenbush, Prentice-Hall 1988, set forth below, lists prior art objective measurements of voice quality with their respective correlation coefficients to actual MOS values ranging from a low of 0.06 to a high of 0.77. A 1.00 coefficient represents perfect MOS prediction, while 0 indicates no correlation. Thus, the prior art processes are not good substitutes for actual MOS testing.

TABLE 1

| Objective Speech Quality Measure | Correlation p |
|---|---|
| Signal to Noise Ratio ("SNR") | 0.24 |
| Segmental SNR | 0.77 |
| Linear Predictive Coding ("LPC") Based Measures | |
| Linear Predictor Coefficient | 0.06 |
| Log Predictor Coefficient | 0.11 |
| Linear Reflection Coefficient | 0.46 |
| Log Reflection Coefficient | 0.11 |
| Linear Area Ratio | 0.24 |
| Log Area Ratio | 0.62 |
| Log Likelihood Ratio | 0.60 |
| Cepstral Distance | 0.63 |
| Weighted Spectral Slope | 0.73 |
| Filter Bank | 0.72 |

Thus, there is a need in the art for an effective, automated measurement of signal characteristics, e.g., signal quality, to provide a less costly and quicker means of signal assessment. In particular, for voice signals, the automatic calculation of MOS scores directly from voice signals, without human evaluators would be of great practical value. Such a technique would provide information at faster iterations of design/evaluation than is possible with subjective measurements performed by human evaluators.

SUMMARY OF THE INVENTION

The present invention provides a method and apparatus for measuring at least one signal characteristic. Initially, a set of features is selected which characterize a signal. An intelligent system, such as a neural network, is trained in the relationship between feature sets and signal characteristics. The selected feature set is then extracted from a first input signal. The extracted feature set from the first signal is input to the trained intelligent system. The intelligent system creates an output signal based on the feature set extracted from the first input signal. This output signal is then used to characterize the input signal.

In one embodiment, the subject invention is employed to assess voice quality, typically as expressed in MOS scores, in a manner which accurately corresponds to the analysis of human evaluators. For voice signals processed by voice coders, the present invention provides a measurement technique which is independent of various voice coding algorithms and consistent for any given algorithm.

DETAILED DESCRIPTION

Figure 1:
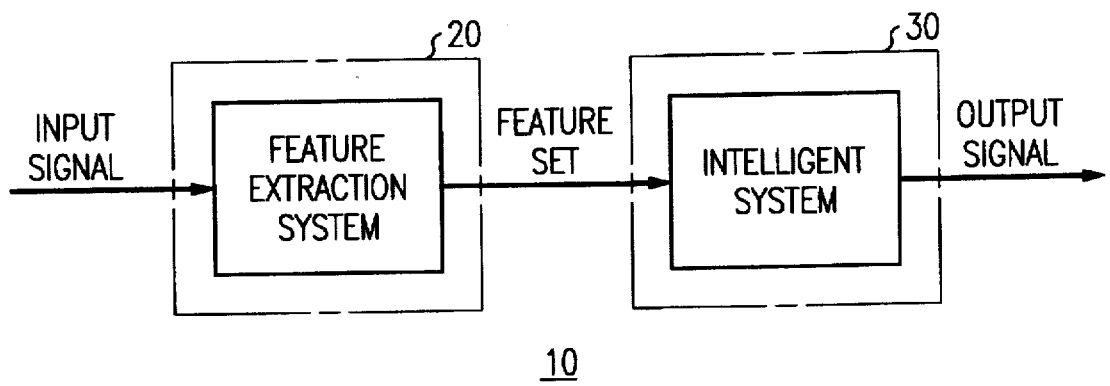
FIG. 1 schematically depicts a signal characteristic measurement system according to the present invention.

Referring now to FIG. 1 a signal characteristic measurement system 10 is depicted according to one embodiment of the present invention. Signal measurement system 10 comprises two principal sub-systems, feature extraction system 20 and intelligent system 30. In feature extraction system 20, a feature set is derived from an input signal. A feature set is a group of signal parameters which characterize an input signal with respect to the signal attribute to be measured by system 10. The feature set extracted from the input signal is sent from feature extraction system 20 to intelligent system 30. Advantageously, the use of feature extraction system 20 reduces the quantity of data to be processed by the intelligent system.

Intelligent system 30 is trained in the relationship between feature sets and corresponding signal characteristics. Intelligent system 30 operates on the extracted feature set to produce an output signal which characterizes the input signal for the attribute being measured. As used herein, the expression "intelligent system" refers to any system which is capable of adaptive learning, e.g., learning which is adjusted to accommodate changing circumstances. Examples of intelligent systems are systems which employ artificial intelligence (e.g., machines capable of imitating intelligent human behavior) and neural networks. Neural networks include systems which can learn through trial and error processes. Typically, neural networks employ plural processing elements interconnected such that the network simulates higher order mental functioning.

Figure 2:
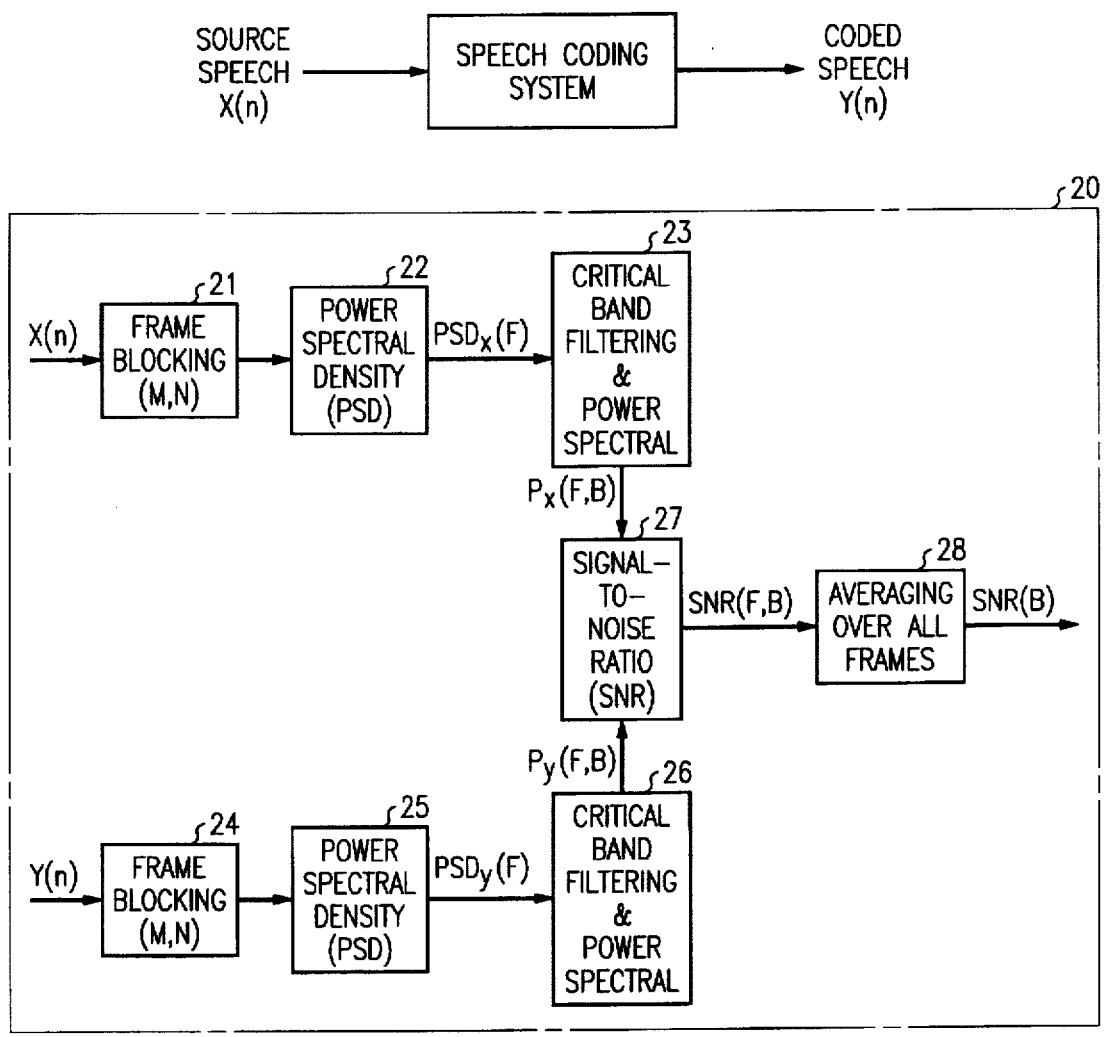
FIG. 2 schematically depicts a feature extraction system for voice signals employed in the signal characteristic measurement system of FIG. 1.

FIG. 2 depicts a feature extraction system 20 employed in the analysis of voice signal quality. In this embodiment, signal characteristic measurement system 10 is used to determine voice signal quality as represented by MOS scores quantifying subjective human analysis. For accurate MOS score measurement, i.e., MOS scores which closely correlate to those generated by human evaluators, the feature set comprises a set of parameters which captures the spectral distortion of a subject voice signal, e.g., a coded voice signal, from a reference signal over the ear-critical frequency bands. Since many psycho-acoustic studies of perceived sound differences can be interpreted in terms of difference of spectral features, the use of spectral distortion as a feature set parameter is one approach to feature set selection.

In the embodiment of FIG. 2, the feature set is based upon a power spectral measure. While this is one approach to feature set compilation, it is understood that the present invention is capable of employing a variety of approaches to capture a set of features based on the desired metrics. Other metrics which can be employed in voice signal feature set compilation include a Bark transform (power spectral in the Bark domain, an EIH (ensemble interval histogram) model, and an information index model. Additional parameters, such as those described, are optionally added to the feature set to expand the robustness of the technique.

In the FIG. 2 embodiment, a source voice signal is represented as X(n) while a coded voice signal (the term coding used herein as defined above) is represented as Y(n). While FIG. 2 depicts feature extraction in terms of coded voice signals, it is understood that the present invention is applicable to voice signals from a variety of sources, both coded and uncoded. Both the original signal X(n) and its coded version Y(n) are separately processed by substantially similar operations.

To prepare for feature extraction, the signal is blocked into M frames of N samples. In an exemplary embodiment, the frames are non-overlapping. Frame blocking of the signal X(n) takes place at frame-blocking circuit 21, and of the signal Y(n) at frame-blocking circuit 24. The number of frames M, depends on the length of the signal. The number of samples available for analysis over a short-time interval depends on the frequency of the signal and the duration of that interval. In one operation of the subject invention, the analyzed voice signal was a 16 bit linearly quantization sampled at 8 kHz. The signal was and should preferably be analyzed in discrete short-time intervals, Y(n) (or X(n)). It is assumed that within a 5–25 ms interval the signal is time invariant or quasi-stationary. This assumption is important because parameter estimation in a time-varying (non-stationary) system is more difficult. For voiced speech, the signal is assumed to be time-invariant over a 20 ms interval. Physically, this means that the shape of the vocal tract remains constant over this interval. Thus where a voice signal is sampled at 8 kHz, an analysis window of 8 ms results in N equals 64 samples. The output of the frame blocking step is the matrix Y(1:M, 1:N)(or X(1:M, 1:N)).

After the signal is blocked into frames, the power spectral density ("PSD") of the signal, per frame ($PSD_y(F)$ (or $PSD_x(F)$)) is calculated at block 22 for X(n) and block 25 for Y(n). This is the beginning of feature extraction. The PSD is computed as follows. For frame i in signal x:

$$PSD_x(i)=(abs(fft(X(i,1:N)),N))^2/N \quad i=1,2,\ldots,M$$

Similarly, for frame j in signal Y:

$$PSD_y(j)=(abs(fft(Y(j,1:N)),N))^2/N \quad j=1,2,\ldots,M$$

where fft(x) is the Fast Fourier Transform of the vector x. In general, the PSD for a given frame is an array of N elements (N=64) representing the power spectral density over a given frequency range.

To determine the frequency range over which the analysis should be performed, the peripheral auditory analysis model by critical band filters is employed. The peripheral auditory analysis model results from studies showing poorer discrimination at high frequencies than at low frequencies in the human auditory system and observations on masking of tones by noise. The model postulates that sounds are preprocessed by critical band filters, with center frequency spacing and bandwidths increasing with frequency. These filters may be viewed as the tuning curves of auditory neurons. Table 2 provides a set of approximations of measured critical bandwidths.

TABLE 2

| Critical Band Number | Center Frequency (Hz) | Critical Band (Hz) | Lower Cutoff Frequency (Hz) | Upper Cutoff Frequency (Hz) |
| --- | --- | --- | --- | --- |
| 1 | 50 | — | — | 100 |
| 2 | 150 | 100 | 100 | 300 |
| 3 | 250 | 100 | 300 | 300 |
| 4 | 350 | 100 | 300 | 400 |
| 5 | 450 | 110 | 400 | 510 |
| 6 | 570 | 120 | 510 | 630 |
| 7 | 700 | 140 | 630 | 770 |
| 8 | 840 | 150 | 770 | 920 |
| 9 | 1000 | 160 | 920 | 1080 |
| 10 | 1170 | 190 | 1080 | 1270 |
| 11 | 1370 | 320 | 1270 | 1480 |
| 12 | 2600 | 340 | 1480 | 1720 |
| 13 | 2850 | 280 | 1720 | 2000 |
| 14 | 2150 | 320 | 2000 | 2320 |
| 15 | 3500 | 380 | 2320 | 2700 |
| 16 | 3900 | 450 | 2700 | 3150 |
| 17 | 3400 | 550 | 3150 | 3700 |
| 18 | 4000 | 700 | 3700 | 4400 |
| 19 | 4800 | 900 | 4400 | 5300 |
| 20 | 5800 | 1100 | 5300 | 6400 |

For voice signal quality analysis, the power spectral is computed per frame for each critical band as follows. Since the maximum frequency component in the voice signal is 4000 Hz, the first 18 critical bands of the above table are selected. Accordingly, the PSD for each frame calculated in blocks 22 and 25, respectively passes through critical band filters 23 and 26 restricting the PSD to an upper limit of 4000 Hz. For frame i in signal X, the power spectral for a band b, $P_x(i,b)$ is given by:

$$P_x(i,b) = \Sigma_{fb} PSD_x(i)$$

where fb is the frequency range of the critical band b. Similarly, for frame j in signal Y the power spectral for a band b, $P_y(j,b)$ is $$P_y(j,b) = \Sigma_{fb} PSD_y(j).$$

The output of this step is the vector of power spectral for each frame and each band $P_y(F,B)$, (or $P_x(F,B)$).

After computing the power spectral for the original voice signal and the coded voice signal, for each frame and band, the power spectral distortion can be computed at 27 and averaged at 28 over all frames for each band. The power spectral distortion is given by the signal-to-noise ratio ("SNR") which for each band b in frame i is given by:

$$SNR(i,b) = 10 \log(abs(P_x(i,b)/(P_x(i,b) - P_y(i,b))))$$

The average SNR per band over all frames is given by:

$$SNR(b) = 1/M(\Sigma_{i=1:M} SNR(i,b))$$

which represents the feature set to be applied to the intelligent system. This feature set has 18 elements—corresponding to the 18 critical bands—representing the spectral distortion of the coded voice at the critical frequency bands. The final data rate is, for an 8 second length voice signal, 18 (bands)×16 (bits per signal)=288 bits per voice signal compared with 8000 (cycles per second)×16 (bits per cycle)×8 (seconds)=1000 kbits.

After the SNR is averaged over all frames, feature extraction is complete and the feature set becomes the new input signal for intelligent system 30. The signal processing performed in block 20 of FIG. 1 results in faster processing by the system and more direct convergence to the proper weights necessary for the intelligent system to accurately characterize the input signal.

The feature set is processed by intelligent system 30 to measure the input signal characteristics. In order to accurately characterize the feature set extracted from the input signal, the intelligent system is first trained in the relationship between feature sets and signal characteristics. Following training, the intelligent system is operated to yield the signal characteristic being assessed.

Figure 3:
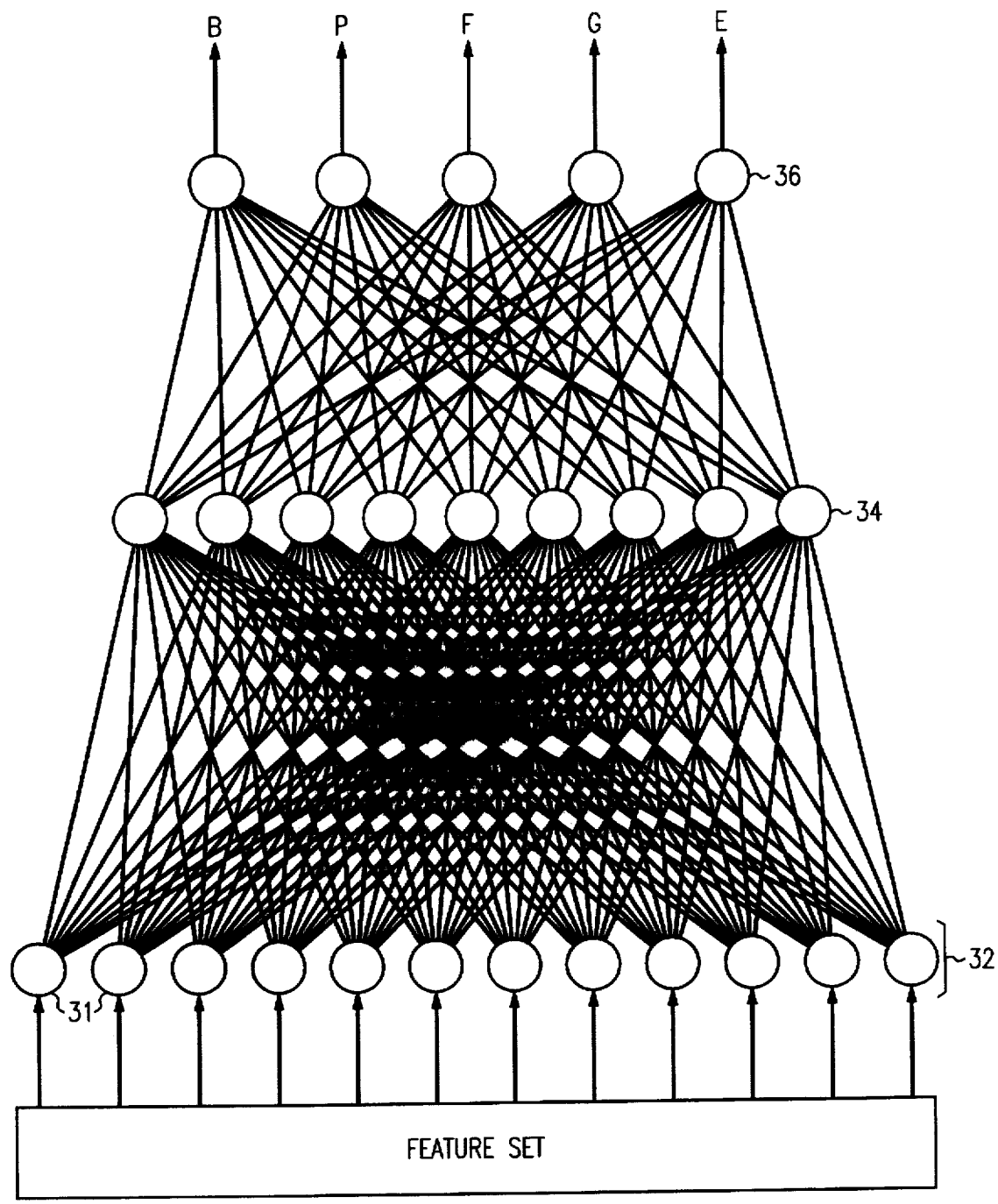
FIG. 3 schematically depicts a multilayer perceptron ("MLP") neural network employed in one embodiment of a signal characteristic measurement system.

In an exemplary embodiment, intelligent system 30 comprises a neural network, schematically depicted in FIG. 3. While the following description relates to a neural network embodiment, it is emphasized that any system capable of adaptive learning, as described above, can be employed as intelligent system 30.

An exemplary neural network employed in the present invention comprises a multilayer perceptron ("MLP"). As depicted in FIG. 3, the neural network includes a plurality of nodes 31 called neurons. The system output for any given input is a function of the various neurons activated by the input. As shown in FIG. 3, the MLP neural network has three layers of neurons. The first (input) layer 32 receives the input signal, passes its output to the second (hidden) layer 34 which passes its output to the last (output) layer 36 which then generates the output for the system. The expression "hidden" when applied to a particular neuron or layer, refers to a neuron or layer which is intermediate an input or output neuron or layer. A preferred embodiment of the subject invention uses eighteen (18) neurons in the input layer, thirty-six (36) neurons with sigmoid activation function in the hidden layer, and five (5) neurons with sigmoid activation function in the output layer. Further description of the operation of neural networks is found in R. H. Nielsen, *Neurocomputing*, (Addison-Wesley, 1990), the disclosure of which is incorporated by reference herein.

The neural network is trained in the relationship between feature sets and signal characteristics. Neural networks learn in a variety of ways. For analysis of voice signal quality, the neural network of the present invention learns the relationship between MOS values, i.e., the signal characteristic being measured, and the extracted feature set (described above). The training data set includes a number of different voice feature sets and their corresponding MOS values.

For the voice signal analysis of the present invention, training employs a backpropagation algorithm, enhanced with momentum and adaptive learning rate algorithms. While use of the backpropagation algorithm is illustrative, it is understood that any algorithm or group of algorithms suitable for training of neural networks can be employed in the present invention. In backpropagation, the input and output of the input layer are the same. For each input-hidden neuron connection there is a corresponding weight reflecting the strength of that connection. Upon receiving the input signal each hidden neuron factors in the weight and any threshold value to all the input signals it receives and then calculates their weighted sum. The weighted sums of all the hidden nodes are sent to the output nodes. During training each output neuron is aware of the target output. Based on the difference between the actual and target outputs, the output neuron determines whether the initial weights have to be increased or decreased. That difference is then propagated back to the hidden nodes which adjust all their weights by that same amount. Since all the weights are adjusted equally, the optimal weights are generally obtained after many iterations.

Momentum allows a network to respond not only to the local gradient, a function of the last difference between target and actual output, but also to recent trends in the error surface. Acting like a low pass filter, momentum allows the network to ignore small features in the error surface. Without momentum, the system can become trapped in a shallow local minimum. With momentum, the network avoids becoming trapped in such local minima, assisting convergence of each weight to its optimal value.

Another algorithm, adaptive learning rate, further enhances training of the neural network. First, the initial network output and error are calculated. At each iteration, new weights and biases are calculated using the current learning rate. New output and error are then calculated. If the new error exceeds the old error by more than a predefined ratio, the new weights, biases, output, and error are discarded and the learning rate is decreased. Otherwise, the new weights, biases, output, and error are kept. If the new error is less than the old error, the learning rate is increased. This procedure increases the learning rate, but only to the extent that the network can learn without large increases in error. Thus a near optimal learning rate is obtained. When a larger learning rate could result in stable learning, the learning rate is increased. When the learning is too high to guarantee a decrease in error, it is decreased until stable learning resumes.

Using the above approach, the intelligent system produces, from the input feature set, an output signal. For voice signal feature sets, the output signal relates to the MOS score for the input signal. The MOS score is rated on a scale of 1–5, 1 being bad and 5 being excellent. The MOS score is calculated from the outputs depicted in FIG. 3 as follows:

MOS=(B+2P+3F+4G+5E)/(B+P+F+E+G), where B, P, F, G, E are the number of evaluations of the voice signal as Bad, Poor, Fair, Good and Excellent, respectively.

Training of the neural network of the present invention is advantageously accomplished as follows. The subject invention was trained and tested with subjective test results from previous human MOS tests. The training feature data sets included voice signals produced by different sources such as by different speech coders and different channel conditions. The voices used in the tests was from analog and digital cellular systems with different Carrier to Interference ratios (C/I). Each ratio for each type of system counted as a separate test condition. Each test condition had eight (8) speakers, four (4) female and four (4) male (F1, F3, F5, F7, M2, M6, M8) and forty-four (44) listeners. Each speaker had two different sentences for a total of 16 sentences. Alternatively, the system can be trained using test results in which different coding rates are used as separate test conditions.

Figure 4:
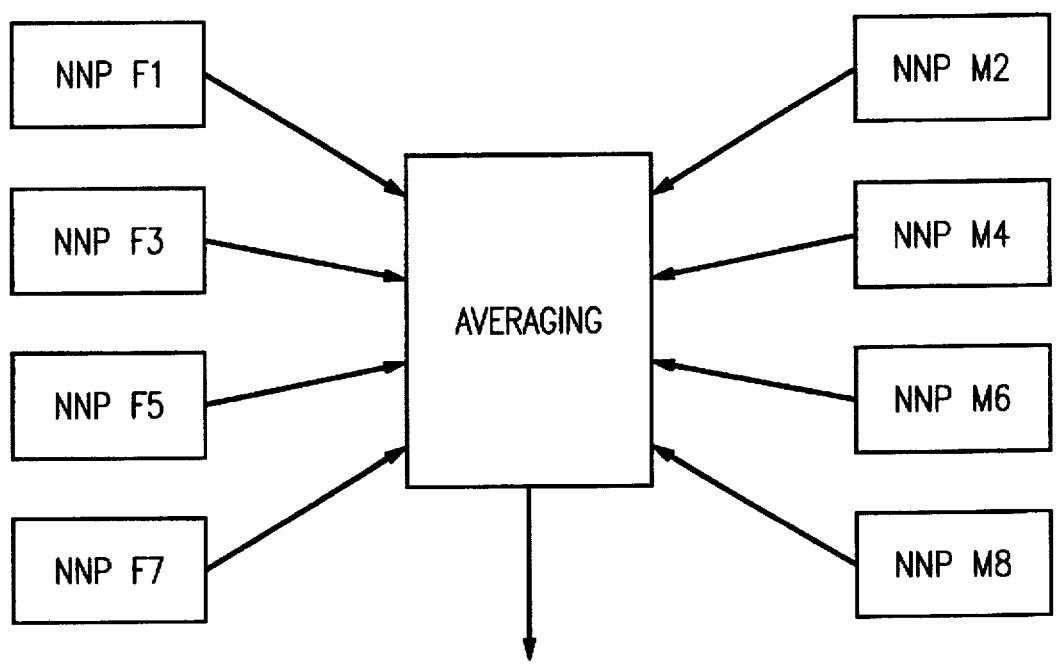
FIG. 4 schematically depicts an array of the signal characteristic measurement systems of FIG. 1 used to provide an average signal characteristic measurement.

To determine an average MOS score, an array of the signal characteristic measurement systems of FIG. 1 are created as depicted in FIG. 4. The FIG. 4 embodiment includes eight signal characteristic measurement systems designated NNP F1, NNP F3, NNP F5, NNP F7, NNP M2, NNP M4, NNP M6, and NNP M8. These designations correspond to the speakers listed above. There was one system per speaker, each trained to learn the relationship between the feature sets of voice signals of its own speaker and the corresponding MOS values independent of the test-condition. Voice samples are based on two sentences by each of four male and female speakers and are similar to the samples used for a human MOS test. As shown in FIG. 4, the eight (8) MOS scores per test condition were averaged for a final average MOS score. Advantageously, this final MOS score is used for communication system evaluation, voice coder/decoder evaluation, coding algorithm evaluation, and the like. For the conditions described above, the average MOS error was found to be 0.05 with a standard deviation of 0.15.

Advantageously, the embodiments of the present invention, when applied to human speech, are language-independent. That is, the methods and apparatus accurately correlate to the MOS values of human evaluators regardless of the natural language employed by the speaker. Consequently, the present invention can be used to analyze new voice coding algorithms. The system and method described above provide a fast, accurate indication of signal quality. Due to their speed and accuracy, embodiments of the present invention can be employed in communications network to dynamically control network parameters to yield improved voice quality.

The foregoing merely illustrates the principles of the invention. It will thus be appreciated that those skilled in the art of the invention will be able to devise various modifications. For example, the present invention is applicable to video signal analysis. Analysis of video compression/ decompression techniques, e.g., MPEG techniques for multimedia systems, also benefits from the above-described signal characteristic measurement methods. Accordingly, such modifications, although not explicitly described, embody the principles in the invention and are thus within its spirit and scope.

What is claimed is:

1. A method for measuring a characteristic of a test signal comprising:

selecting a set of features which characterize the test signal and a signal under test;

extracting the set of features from the test signal and from the signal under test;

inputting the extracted sets of features of the test signal and signal under test into a differential set of features extractor;

calculating a differential set of features with said differential set of features extractor;

outputting from said differential set of features extractor said differential set of features;

inputting the differential set of features to an intelligent system which has been trained in the relationship between the differential set of features and the signal characteristic of the test signal, the intelligent system creating an output signal based on the differential set of features from the test signal and signal under test; and using the output signal of the intelligent system to characterize the test signal.

2. A method in accordance with claim 1 wherein selecting said set of features includes choosing one or more metrics representative of the test signal characteristic and calculating the feature set based upon the chosen metrics.

3. A method in accordance with claim 2, wherein using the output signal further includes averaging a weighted sum of a plurality of the output signals from the intelligent system to provide an average measure of signal characteristics.

4. A method in accordance with claim 1 wherein the intelligent system comprises a neural network.

5. A method in accordance with claim 1 wherein the intelligent system is trained by use of a backpropagation algorithm.

6. A method in accordance with claim 1 wherein the intelligent system is trained by use of a momentum algorithm.

7. A method in accordance with claim 1 wherein the intelligent system is trained by use of an adaptive learning rate algorithm.

8. A method in accordance with claim 1 wherein the test signal and signal under test each comprise a voice signal.

9. A method in accordance with claim 1 wherein the signal under test comprises a voice signal and the test signal comprises the voice signal encoded.

10. A method for measuring the voice quality of a voice signal by means of a neural network, said neural network having an input port and producing at least one output signal, the method comprising:

providing the voice signal;

selecting a set of features based on one or more selected metrics;

extracting the set of features from the voice signal;

training a neural network in the relationship between the set of features and a corresponding measure of voice signal quality;

presenting the set of features extracted from the voice signal to an input port of the neural network; and using the neural network to create an output signal indicative of voice signal quality of the voice signal.

11. A method in accordance with claim 10, wherein said neural network training includes use of a backpropagation algorithm.

12. A method in accordance with claim 10, wherein said neural network training includes the use of a momentum algorithm.

13. A method in accordance with claim 10, wherein said neural network training further includes use of an adaptive learning rate algorithm.

14. A method in accordance with claim 10 wherein the output signal is averaged using a weighted sum with a plurality of output signals to provide a measure of voice signal quality.

15. A method for measuring signal quality comprising:
    selecting a set of features based on selective metrics representative of a test signal and a signal under test;
    extracting the set of features from the test signal and from the signal under test;
    computing a differential set of features of the test signal and signal under test which characterize the test signal with respect to the signal under test based on the selected set of features of the test signal under test;
    training a neural network in the relationship between the differential set of features and one or more and corresponding subjectively-obtained criteria;
    inputting the computed differential set of features to the neural network; and
    utilizing an output of the neural network to produce a measure of signal quality.

16. A method in accordance with claim 15 wherein the selected metrics are based on a power spectral measure.

17. A method in accordance with claim 15 wherein the subjectively-obtained criteria is based on MOS scoring.

18. A method in accordance with claim 15 wherein the feature extraction includes obtaining a coded and uncoded version of the signal, frame blocking both the coded and uncoded versions of the signal, determining the power spectral densities of the frame blocked signal, filtering the determined power spectral densities, and establishing the signal-to-noise ratio between the filtered power spectral densities.

19. Apparatus for measuring a characteristic of a test signal comprising:
    a set of features extractor for extracting a set of features which characterize the test signal and a signal under test from the test signal and from the signal under test;
    a differential set of features extractor for extracting a differential set of features which characterize the test signal with respect to the signal under test from the set of features of the test signal and signal under test; and
    an intelligent system which has been trained in the relationship between said selected differential set of features and signal characteristics, for receiving said extracted differential set of features;
    creating an output signal comprising information for characterizing the test signal.

20. Apparatus in accordance with claim 19 wherein the intelligent system comprises a neural network.

21. Apparatus in accordance with claim 20 wherein the neural network comprises a multilayer perceptron including an input layer, one or more hidden layers, and an output layer.

* * * * *